Aug. 11, 1931.          A. G. NELSEN          1,818,004
            CHAIN APPLYING AND REMOVING EQUIPMENT
              Filed Nov. 20, 1929    2 Sheets-Sheet 1
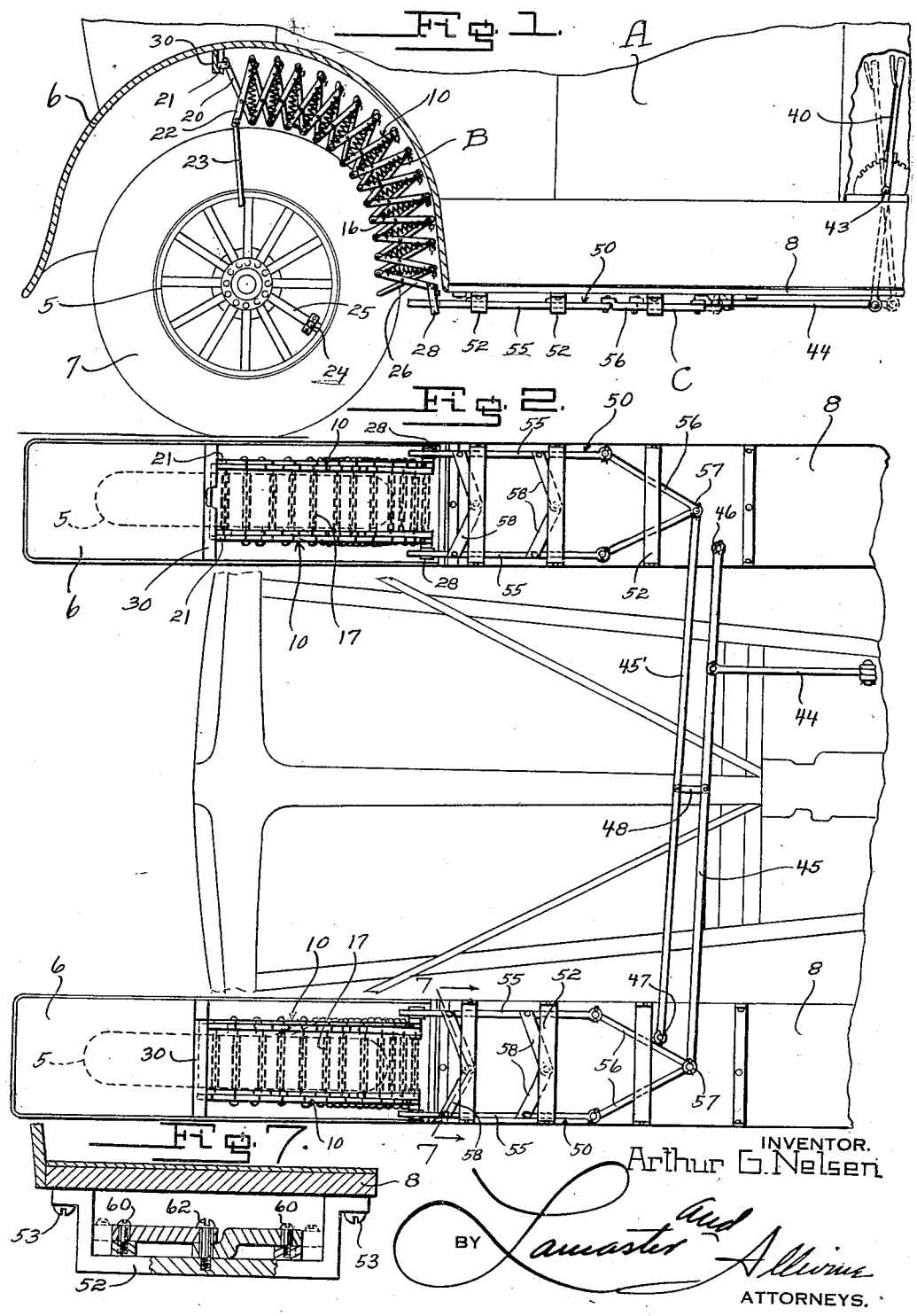
INVENTOR.
Arthur G. Nelsen
BY Lamaster and Allwine
ATTORNEYS.

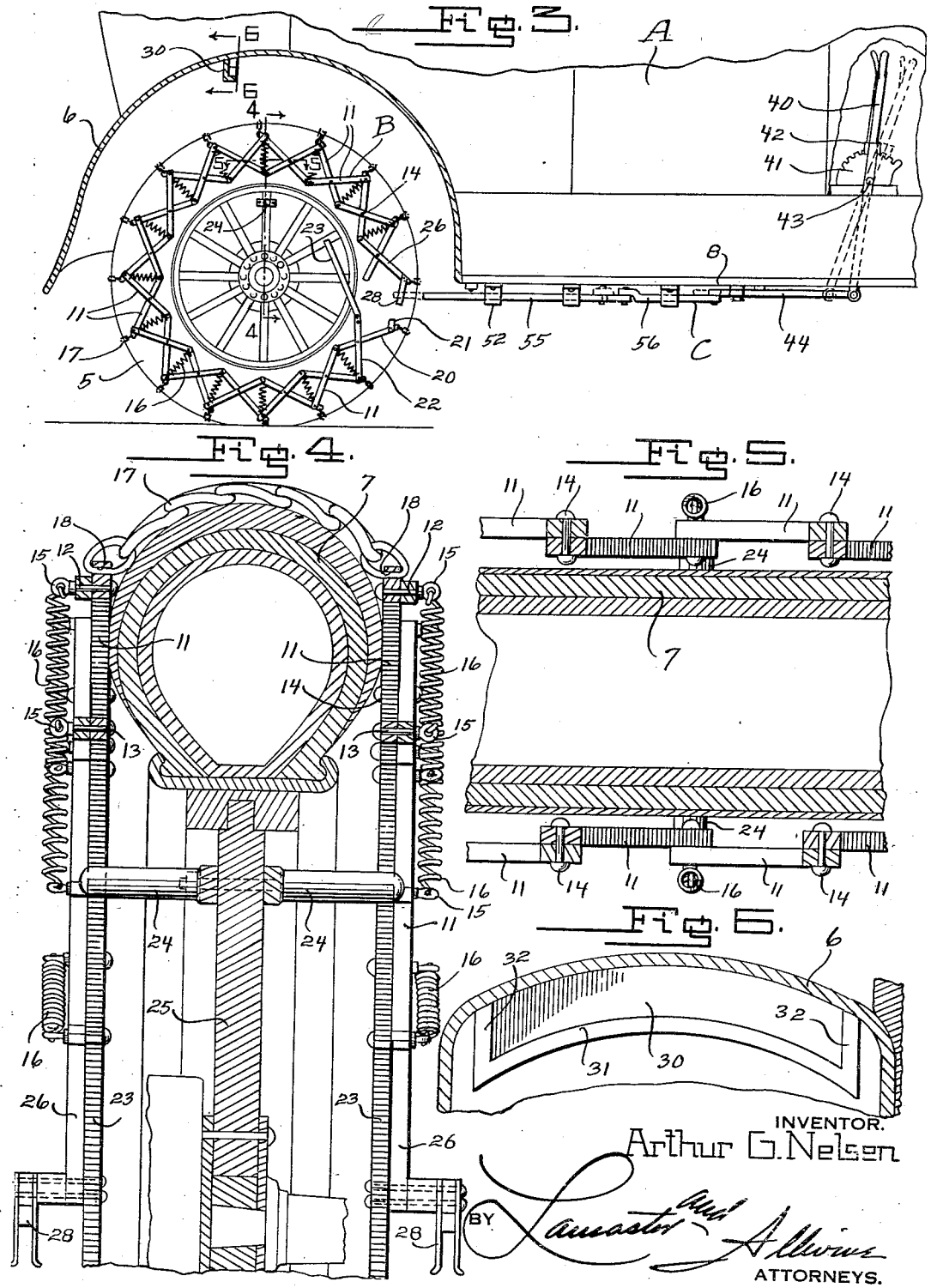

Patented Aug. 11, 1931

1,818,004

UNITED STATES PATENT OFFICE

ARTHUR G. NELSEN, OF WILLMAR, MINNESOTA

CHAIN APPLYING AND REMOVING EQUIPMENT

Application filed November 20, 1929. Serial No. 408,613.

The present invention relates to anti-skid devices for vehicle wheels and the primary object of the invention is to provide an improved anti-skid device and means for applying and removing the device from the vehicle wheel during travel of the vehicle.

A further object of the invention is to provide apparatus of this character adapted to be operated from the driver's seat for applying and removal of the anti-skid device from the vehicle wheel.

A further object of the invention resides in the provision of an anti-skid device adapted to frictionally grip the sides of the tire with means for spreading the anti-skid device for removal thereof from the tire.

A further object of the invention is to provide a device of this character which may be applied to conventional types of motor vehicles and one wherein the anti-skid device of novel construction is supported beneath the vehicle fender when disengaged from the tire.

Other objects and advantages of the invention will be apparent during the course of the following detailed description, taken in connection with the accompanying drawings forming a part of this specification and in which drawings:

Figure 1 is a fragmentary side elevation of a motor vehicle showing the device applied thereto and with the anti-skid device in its position removed from the tire.

Figure 2 is a bottom plan view of the vehicle showing the apparatus applied and in the condition shown in Figure 1.

Figure 3 is a view showing the handling device released and the anti-skid device applied to the tire.

Figure 4 is an enlarged fragmentary section on line 4—4 of Figure 3.

Figure 5 is an enlarged fragmentary section on line 5—5 of Figure 3.

Figure 6 is an enlarged fragmentary section on line 6—6 of Figure 3.

Figure 7 is an enlarged section on line 7—7 of Figure 2.

Referring to the drawings in detail, and wherein similar reference characters designate corresponding parts thruout the several views, the letter A designates a motor vehicle of usual construction, B improved anti-skid devices for placing and removal from the rear wheels of the vehicle by the handling means C.

As in usual construction each of the rear wheels 5 of the vehicle are provided with the arcuate shaped fenders 6 spaced above the tires 7 of the wheels. Extending forwardly from the forward lower end of each fender 6 is the usual running board 8.

Referring now to the anti-skid devices B and one of which is intended to be associated with each of the rear vehicle wheels 5, the same are of identical construction and each embodies a pair of lazy tong structures 10.

The structures 10 are formed of a series of cross connected levers 11 being pivotally connected together at their outer ends by pivot pins 12 and at their inner ends by suitable pivot pins 13. The levers 11 are pivotally connected intermediate their ends by a pivot pin 14 and these pivot pins 14 as will be observed are disposed nearer to the inner pivot pins 13 than the outer pivot pins 12. This spacing of the pivot pins 14 with respect to the pivot pins 12 and 13 causes the lazy tong structure 10 to be of arcuate formation when contracted or folded and causes the structures when extended to be of circular or ring-like formation as shown in Figure 3.

The pivot pins 12 and 13 connecting the ends of the levers 11 are formed at their outer ends with suitable eyes 15 and connected between these eyes 15 of each pair of levers 11 is a contractile coil spring 16. These series of springs 16 act to normally extend the structures 10 by the action of the springs tending to draw the pivot pins 12 and 13 toward one another and pivoting the levers about the pivot pins 14. Connected between the outer ends of the levers 11 of one lazy tong structure 10 and the outer end of the levers 11 of the companion lazy tong structure 10 is a series of cross or tread chains 17 which are adapted to extend transversely of the tread portion of the tires 7 when the anti-skid device is applied. These tread chains 17 may be secured to the lazy tong structures in any preferred manner and in the example shown, one lever of each pair is apertured beyond the pivot pins 12 as at 18 for receiving the terminal links of the cross chains.

One pair of levers 11 and which may be termed the rear pair of levers, has the lever 20 thereof provided at its outer end with a hook extension 21 which when the device B is applied to the tire projects from the lever in a direction reversed to the direction of rotation of the wheel 5 while the vehicle is travelling forwardly. These hook extensions 21 are of course provided on the rear lever 20 of each lazy tong structure 10. The lever 22 of the rear pair of levers is provided at its inner end with an arm 23 which is offset inwardly from the lever 22 when the anti-skid device is in position upon the wheel as clearly shown in Figure 3. These arms 23, one of which is carried by each lever 22 are intended to be engaged by the outer ends of releasing pins 24 secured to one of the wheel spokes 25. These releasing pins 24 engage the arms 23 for removal of the anti-skid device from the vehicle wheel in a manner to be subsequently explained.

Each lever 26 of the front pair of levers of each lazy tong structure 10 carries at its outer end a U-shaped hook or fork 28. These hooks or forks 28 as will be observed in Figure 4 are offset outwardly from the structures 10 beyond the plane of the springs 16. As will be observed in Figures 1 and 3 the hooks or forks 28 are offset forwardly from their levers 26 so that the open ends of the forks face in the direction of rotation of the vehicle wheel during forward travel of the vehicle. This forward opening of the forks 28 disposes the forks in a position to be engaged by the handling means C for removal of the anti-skid devices from the vehicle wheels during travel of the vehicle.

Secured to the under side of the fender 6 is a holder 30 having an arcuated bottom wall 31 the lower ends of which extend to end walls 32 arranged adjacent the inner and outer edges of the fender. As will be observed this holder 30 extends transversely of the fender with the arcuate bottom wall 31 extending in an arc transversely of the vehicle wheel.

The handling means C for placing and removal of the anti-skid devices B from about the wheels 5 embodies an operating lever 40 provided with a rack 41 with which a suitable keeper 42 co-acts for retaining the lever in adjusted positions. The lever 40 is preferably mounted adjacent the driver's seat and has its lower end, below the pivot point 43, extended beneath the floor of the vehicle body between the running boards 8. Pivotally connected to the lower end of the lever 40 is a link 44 which is pivotally connected at its rear end to an operating lever 45 pivotally connected at one end as at 46 to the under side of one of the running boards 8 and extending transversely of the vehicle with its free end extending beneath the opposite running board. Thus it will be seen that upon forward and rearward swinging of the lever 40 about its pivot 43 that the free end of the operating lever 45 will be swung in a direction forwardly and rearwardly of the vehicle. A second operating lever 45′ extends transversely beneath the vehicle rearwardly of the operating lever 45 with one end pivotally connected as at 47 to the under side of one running board 8 and having its free end extending beneath the opposite running board 8. As will be observed in Figure 2 the operating levers 45 and 45′ are pivotally mounted one upon each of the running boards with their free ends extending beneath the companion running board. The levers 45 and 45′ are connected intermediate their ends by a link 48 whereby swinging movement is imparted to the lever 45′ when the lever 45 is operated with a like direction of movement imparted to the free end of the levers. The free ends of the operating levers 45 and 45′ are each connected with similarly formed grippers 50 mounted beneath the running boards 8.

The grippers 50 each include three U-shaped supporting brackets 52 extended transversely beneath the running boards and secured at their upturned ends to the running boards by suitable fastening elements 53. Slidably mounted in the two rear brackets 52 is a pair of grip rods 55 each having pivotally connected to its rear end a link 56 and which links extend in forwardly converging relation and are pivotally connected at their forward ends as at 57 to the free ends of their respective operating levers 45 and 45′.

A toggle joint arrangement is provided for imparting lateral or spreading movement to the grip rods 55 when moved longitudinally and this means consists of two sets of toggle arms 58 connected between two of the brackets 52 and the rods 55. The outer ends of the arms 58 are pivotally connected by suitable pivots 60 to the rods 55, while the inner ends of the arms are connected by a suitable pivot 62 to the upper sides of the brackets supporting the rods 55. Thus it will be seen that when longitudinal movement is imparted to the grip rods by the operating levers 45 and 45′ lateral movement will be imparted to the rods by the arms 58. The position of the grip rods as shown in Figures 1 and 2 is that of holding the anti-skid devices off the vehicle wheels and in their position the rods 55 are in their spread position. Rearward movement of the grip rods from the position shown in Figure 2 will tend to move the rods toward one another.

Referring particularly to Figure 1 and wherein the device is shown in a position with the anti-skid device removed from the vehicle wheel it will be observed that the hooks 21 are engaging in the holder 30 and the grip rods 55 engaging the forks 28 whereby the anti-skid device is held in an arcuate shape beneath the forward portion of the fender 6. In this view it will be observed that the action of the springs 16 acting to normally extend the lazy tong structures retains the hooks 21 in the holder 30 and the forks 28 against the rear ends of the grip rods 55.

In applying the anti-skid devices the operator merely pulls rearward on the lever 40 which in turn moves the grip rods 55 forwardly until the forks 28 are released from the ends of the rods. Immediately upon release of the forks 28 the springs 16 act to extend the lazy tong structures 10 and owing to the specific pivotal connection of the levers 11 the lazy tong structure when extending moves into circular formation which causes the forward end of the anti-skid device to be moved beneath the wheels during forward travel of the vehicle. As the cross chains 17 pass beneath the tire the levers 11 are forced over the side walls of the tire. The hooks 21 are readily withdrawn from the holder 30 and after a complete revolution of the wheels the springs 16 have so extended the levers 11 as to cause the structures 10 to assume a circular formation about the tire. The tendency of the springs 16 to further extend the lazy tong structures draws the cross chains 17 into contact with the tread surface of the tire and also the lazy tong structures into contact with the side walls of the tire as shown in Figure 4.

When removing the anti-skid devices from the tire the operator pushes forwardly on the lever 40 moving the same into a position as shown in dotted lines in Figure 3 which thru the connecting levers and links moves the grip rods 55 rearwardly into the path of travel of the forks 28. Since the forks 28 are offset out of the plane of the springs 16 the rods will not strike portions of the anti-skid device until the forward travel of the vehicle has rotated the wheels for bringing the forks into a position as shown in Figure 3 whereby the forks will engage the ends of the rods 55. With the forward end of the anti-skid devices caught by the rods 55, rotation of the wheel will cause the lazy tong structures 10 to be folded against the action of the springs 16. After the structures have been folded beneath the forward portion of the fenders, continued rotation of the wheels causes the pins 24 to engage the arms 23 whereby the pins when riding past the arms will raise the rear end of the anti-skid device against the under side of the chain forwardly of the holder 30. As the pins ride off the ends of the arms 23 the action of the springs 16 tending to extend the lazy tongs forces the hooks 21 rearwardly into the forwardly opening holder 30 and in which position the ends of the arms 23 are out of the circular path of movement of the releasing pins.

As the hooks 21 engage in the holder 30 the arcuate bottom wall 31 moves the hooks to the end walls 32 and so spreads the lazy tong structures as to dispose the levers 11 and arms 23 spaced from possible contact with the side walls of the tire. The lever 40 is then swung rearwardly for a short distance exerting a forward pull on the grip rods 55 and causing the rods to be spread by the arms 58. This spreading of the arms 55 so spreads the forward portion of the anti-skid device as to retain the inner ends of the levers 11 out of possible rubbing contact with the side walls of the tire 7. Thus it will be seen that the devices B may be applied and removed from the wheels during forward travel of the vehicle thru merely operating the lever 40.

From the foregoing it will be seen that a novel and improved device of this character has been provided whereby anti-skid devices of novel construction may be readily applied and removed from the rear wheels of motor vehicles during travel of the vehicle and by the mere operation of a control readily accessible to the driver. It will also be apparent that a novel construction for the anti-skid device has been provided wherein a positive coupling is not required between the ends of the device when applied to the tire, the anti-skid being of such construction as to have a tendency to normally contract itself about the tire. A further feature resides in the novel arrangement whereby the lazy tong structures are held spaced apart when removed from the tire and thus allowing for the anti-skid device to be carried beneath the fender without rubbing contact with the side walls of the tire.

Changes in detail may be made to the form of invention herein shown and described, without departing from the spirit of the invention or the scope of the following claims.

I claim:

1. In combination with a motor vehicle having a running board, a wheel in alignment at the rear end of the running board and a fender above the wheel, an anti-skid device including lazy tong side structures, spring means acting to normally extend the structures from an arcuate to a circular formation, a holder depending from the lower side of the fender above the wheel and adapted to releasably receive the rear portion of the anti-skid device for holding the same out of contact with the wheel, a pair of longitudinally movable grip rods supported beneath the running board to project beyond the rear end thereof, and means carried by the forward end of each lazy tong structure for engagement by the grip rods when projected for releasably supporting the forward end of the anti-skid device out of contact with the wheel.

2. In combination with a motor vehicle having a running board, a wheel in alignment at the rear end of the running board and a fender above the wheel, a holder arranged beneath the upper portion of the fender, an anti-skid device including lazy tong side structures each having a hook at its rear end for releasable engagement with the holder, spring means normally acting to extend the structures from an arcuate to a circular formation, a pair of grip rods supported beneath the running board, means for imparting longitudinal movement to the grip rods, and a fork carried by the forward end of each lazy tongue structure for engagement with the grip rods when moved rearwardly beyond the rear end of the running board.

3. In combination with a motor vehicle having a running board, a wheel in alignment at the rear end of the running board and a fender over the wheel, an anti-skid device embodying lazy tong side structures each having a hook at its rear end and a fork provided at its forward end, spring means acting upon the levers of the lazy tong structures normally tending to extend the anti-skid device to circular formation about the tire of the wheel, a pair of grip rods mounted for longitudinal movement beneath the running board, means for moving the rods into the path of movement of said forks during rotation of the wheel, a forwardly opening holder mounted beneath the upper side of the fender, and release means for the rear end of the anti-skid device for removing the same from the tire whereby said springs extend the lazy tong structures for moving said hooks into the holder.

4. In combination with a motor vehicle having a running board, a wheel in alignment at the rear end of the running board and a fender over the wheel, an anti-skid device embodying lazy tong side structures each having a hook at its rear end and a fork provided at its forward end, spring means acting upon the levers of the lazy tong structures normally tending to extend the anti-skid device to circular formation about the tire of the wheel, a forwardly opening holder supported beneath the upper side of the fender, a pair of longitudinal and laterally movable grip rods mounted beneath the fender, operating means for the rods for moving the rods into the path of movement of the forks and spreading of the lazy tong structures out of contact with the wheel, and releasing means for the rear end of the anti-skid device for removal of the rear end thereof from the wheel to permit engagement of said hooks in the holder.

5. In a device of the class described the combination with a motor vehicle including a running board, a wheel aligning with the rear end of the running board and a fender above the wheel, of an anti-skid device embodying lazy tong side structures, a releasing arm extending inwardly from one of the rear pair of levers of each structure, a hook provided on the rear companion lever of each side structure, a fork provided at the outer end of one front lever of each side structure, a pair of grip rods longitudinally movable beneath the running board, operating means for imparting movement to the grip rods for causing the rear ends of the same to engage said hooks, a forwardly opening holder carried by the under side of the fender above the wheel, and releasing pins projecting from the wheel and engageable with said releasing arms for removal of the rear end of the anti-skid device from the wheel for engagement of said hooks in the holder.

6. In a device of the class described the combination with a motor vehicle including a running board, a wheel in alignment at the rear end of the running board and a fender above the wheel, of an anti-skid device embodying a pair of lazy tong side structures, spring means acting between each pair of pivotally connected levers of the side structures for normally extending the structures about the wheel, a hook provided at the rear end of each side structure, a fork provided at the forward end of each side structure, a forwardly opening holder supported beneath the fender and having an arcuate-shaped bottom wall having stops at each end thereof, a pair of longitudinally and laterally movable grip rods supported beneath the fender for engagement with said forks and spreading of the side structures out of engagement with the wheel, and releasing means for removing the rear portion of the anti-skid device from the wheel for engagement of said hooks in the holder, said arcuate bottom wall of the holder spreading the rear portion of the anti-skid device out of contact with the wheel.

7. In a device of the class described the combination with a motor vehicle including a running board and a wheel aligning rearwardly of the running board with a fender above the wheel, of an anti-skid device for the wheel including lazy tong side structures each having a fork formed at its forward end, means tending to normally extend the lazy long structures about the wheel, and handling means for the anti-skid device including brackets supported beneath said running board, a pair of grip rods mounted for longitudinal movement in the brackets for engagement at their rear ends with said forks, toggle arms connected between the grip rods and brackets for imparting lateral movement to the grip rods when moved longitudinally, a pivoted operating rod extending transversely of the vehicle, a pair of arms pivotally connecting the free end of the operating rod to the forward ends of the grip rods, and a control lever for the operating rod.

8. In an anti-skid device for vehicle wheels, a pair of side structures each comprising a series of pivotal cross connected levers pivotally connected at their inner and outer ends, a spring connected between the inner and outer ends of each pair of levers for normally extending the side structures into circular formation, and cross chains connecting the side structures at the outer ends of the levers.

9. An anti-skid device for vehicle wheels comprising a pair of lazy tong side structures each including a series of cross connected levers having their crossing pivotal connection spaced nearer the inner ends of the levers, a spring connecting the inner and outer ends of the levers for normally extending the side structures into circular formation, and cross chains connected between the side structures at the outer ends of the levers.

10. An anti-skid device for vehicle wheels comprising a pair of lazy tong side structures each embodying a series of cross connected levers having their crossing pivotal connection spaced nearer the inner ends of the levers, an eye formed at the outer ends of the pivotal connections for the ends of the levers, a coil spring connected between the eyes at the inner and outer ends of each pair of levers and acting to normally extend the structures into circular formation, and cross chains connecting the outer ends of the levers of one side structure with the outer ends of the levers of the companion side structure.

ARTHUR G. NELSEN.